United States Patent
Ishii

(10) Patent No.: US 6,314,060 B1
(45) Date of Patent: Nov. 6, 2001

(54) MAGNETIC HEAD FOR MAGNETO-OPTIC RECORDING, AND MAGNETO-OPTIC RECORDING APPARATUS

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,578

(22) Filed: Jul. 16, 1999

(30) Foreign Application Priority Data

Jul. 30, 1998 (JP) ................................................ 10-215858

(51) Int. Cl.$^7$ .................................................. G11B 11/00
(52) U.S. Cl. .................................................................. 369/13
(58) Field of Search ............................... 369/13, 14, 110, 369/116, 112; 360/114, 59, 102, 103

(56) References Cited

U.S. PATENT DOCUMENTS

| | | | |
|---|---|---|---|
| 5,434,831 | * 7/1995 | Ishii et al. | 369/13 |
| 5,485,435 | * 1/1996 | Matsuda et al. | 369/13 |
| 5,517,472 | * 5/1996 | Miyatake et al. | 369/13 |
| 5,523,986 | 6/1996 | Ishii . | |
| 5,550,796 | * 8/1996 | Ishii | 369/13 |
| 5,559,763 | 9/1996 | Ishii . | |
| 5,563,853 | 10/1996 | Ishii . | |
| 5,615,183 | 3/1997 | Ishii . | |
| 5,627,804 | * 5/1997 | Ishii | 369/13 |
| 5,687,141 | 11/1997 | Ishii . | |
| 5,689,478 | * 11/1997 | Ishii et al. | 369/13 |
| 5,703,839 | 12/1997 | Ishii . | |
| 5,986,976 | * 11/1999 | Ishii | 369/13 |
| 5,991,242 | * 11/1999 | Ishii | 369/13 |
| 6,041,024 | * 3/2000 | Ishii | 369/13 |

FOREIGN PATENT DOCUMENTS 05-166630    7/1993   (JP) .

* cited by examiner

*Primary Examiner*—Tan Dinh
(74) *Attorney, Agent, or Firm*—Fitzpatrick, Cella, Harper & Scinto

(57) ABSTRACT

A magnetic head for magneto-optic recording comprises a core including a magnetic pole in the shape of a pillar perpendicular to a magneto-optic recording medium and a coil mounted around the magnetic pole. The core is made of a soft magnetic ferrite showing a relative permeability having a real part $\mu1'$ of between 5 and 700 at a frequency of 100 kHz. The soft magnetic ferrite shows, additionally, (1) a resonance frequency fr of at least 2.1 MHz, (2) a relative permeability having an imaginary part $\mu''$ becoming a maximum at a frequency fp of at least 8 MHz, or (3) a relative permeability having a real part which is between $0.5 \times \mu1'$ and $1.5 \times \mu1'$ in a frequency range of between 100 kHz and 5 MHz. The magnetic pole has a height H and an average cross-sectional area S, satisfying the relation $H/\sqrt{S}=\alpha$, provided that $\alpha \leq 3$.

36 Claims, 6 Drawing Sheets

MAGNETIC HEAD FOR MAGNETO-OPTIC RECORDING, AND MAGNETO-OPTIC RECORDING APPARATUS

BACKGROUND AND SUMMARY OF THE INVENTION

The present invention relates to a magnetic head for magneto-optic recording wherein an information signal is recorded on a magneto-optic recording medium, and also to a magneto-optic recording apparatus which adopts the magnetic head.

There has heretofore been known a magneto-optic recording apparatus which records an information signal in such a way that a magnetic field modulated by the information signal is applied to a magneto-optic recording medium, and that a light beam is focused to irradiate the recording medium therewith. Such a magneto-optic recording apparatus includes a magnetic head for applying the magnetic field to the magneto-optic recording medium, and an optical head for irradiating the recording medium with the light beam. Usually, the magnetic head of this sort is configured of a core which is formed with a magnetic pole in the shape of a pillar opposing the magneto-optic recording medium perpendicularly, and a coil which is mounted around the magnetic pole. In addition, the core is made of a soft magnetic material such as ferrite, for example, an Mn—Zn ferrite (containing $Fe_2O_3$, MnO and ZnO as principal components) disclosed in the official gazette of Japanese Patent Application Laid-open No. 5-166630.

Here, as the permeability of the soft magnetic material making the core of the magnetic head is higher, the magnetic head can generate a stronger magnetic field for a predetermined current supplied to the coil. That is, the magnetic head has a higher efficiency for generating the magnetic field. Also the above official gazette teaches examples of various ferrites whose relative permeabilities $\mu$ are 1090 to 2560 inclusive at a frequency of 1 MHz. In the point of heightening the efficiency of the magnetic head for generating the magnetic field, it is desirable to make the core out of the ferrite of high relative permeability $\mu$ in this manner. However, that appropriate range of relative permeabilities $\mu$ in which influences on the other characteristics of the magnetic head are also considered has not hitherto been sufficiently studied.

Meanwhile, in recent years, the modulation of the magnetic field at a higher frequency has become necessary in the magneto-optic recording apparatus stated before, in compliance with a requirement for heightening the recording speed of the information signal. Nevertheless, as the modulation frequency of the magnetic field is set higher, power loss in the magnetic head increases more, with the result that the magnetic head generates heat to raise its temperature more. The main cause of such power loss in the magnetic head is high-frequency loss in the core. When the temperature of the magnetic head, especially the core, rises due to the heightened modulation frequency of the magnetic field, problems occur in that the magnetic characteristics of the magnetic head degrade, and so forth. In particular, the saturation magnetic flux density of the ferrite making the core decreases with a rise in the temperature. Therefore, when the modulation frequency in the magnetic field is heightened, the saturation magnetic flux density finally becomes equal to a magnetic flux density in the interior of the core. Besides, when the modulation frequency is heightened still more, the magnetic flux density in the interior of the core decreases with that lowering of the saturation magnetic flux density which is ascribable to the rise in the temperature. In consequence, the magnetic field which is generated by the magnetic head also is decreased to render normal recording of the information signal impossible. Such a problem becomes more serious particularly in a case where the maximum modulation frequency of the magnetic field (the inverse number of double the minimum time interval of the inversion of the magnetic field) is set at 5 MHz or above.

The present invention has for its object to provide a magnetic head for magneto-optic recording in which a magnetic field to be generated by a core does not decrease even at high frequencies.

As the result of making a study on the above problem, the inventors determined that, when the core of a magnetic head is made of a ferrite having the appropriate characteristics of a relative permeability $\mu$ and has its magnetic pole set at appropriate dimensions, it is possible to diminish the high-frequency loss of the core which is the cause of the heat generation of the magnetic head and to generate a magnetic field of satisfactory strength forming no hindrance to the recording of an information signal. Thus, the problem involved in the prior art as stated before can be favorably solved.

Concretely, the problem of the prior art can be favorably solved by constructing a magnetic head for magneto-optic recording, having a core which includes a magnetic pole in the shape of a pillar perpendicular to a magneto-optic recording medium; and a coil which is mounted around the magnetic pole; where the core is made of a soft magnetic ferrite whose relative permeability at a frequency of 100 kHz has a real part $\mu 1'$ being at least 5 and at most 700 and whose resonance frequency fr is at least 2.1 MHz, and that $\alpha \leq 3$ holds in a case where a height H and an average cross-sectional area S of the magnetic pole of the core are related as $H/\sqrt{S}=\alpha$.

Alternatively, a similar effect can be attained when the magnetic head for magneto-optic recording is constructed so that the core is made of a soft magnetic ferrite whose relative permeability at a frequency of 100 kHz has a real part $\mu 1'$ being at least 5 and at most 700 and also has an imaginary part $\mu''$ becoming a maximum at a frequency fp of at least 8 MHz, and that $\alpha \leq 3$ holds in a case where a height H and an average cross-sectional area S of the magnetic pole are related as $H/\sqrt{S}=\alpha$.

Yet alternatively, a similar effect can be attained when the magnetic head for magneto-optic recording is constructed so that the core is made of a soft magnetic ferrite whose relative permeability at a frequency of 100 kHz has a real part $\mu 1'$ being at least 5 and at most 700 and whose relative permeability in a frequency range of above 100 kHz to at most 5 MHz has a real part being at least $0.5\, \mu 1'$ and at most $1.5\, \mu 1''$, and that $\alpha \leq 3$ holds in a case where a height H and an average cross-sectional area S of the magnetic pole are related as $H/\sqrt{S}=\alpha$.

More desirably, it is permitted to generate a magnetic field at a still higher efficiency, when the magnetic head for magneto-optic recording is constructed so that the real part $\mu 1'$ of the relative permeability of the ferrite making the core, at the frequency of 100 kHz, satisfies the following equation in accordance with the quantity $\alpha$:

$$10^{1.45+0.343\alpha} \leq \mu 1' \leq 10^{1.93+0.480\alpha}$$

Also effective for solving the problem stated before is that a Curie temperature Tc of the ferrite making the core is at least 200° C., while a saturation magnetic flux density Bs thereof at a temperature of 25° C. is at least 3500 Gausses.

Also effective for solving the problem stated before is that a relative permeability of the ferrite making the core, in a temperature range of at least 20° C. to at most 80° C., has a real part $\mu'$ of plus temperature coefficient.

The magnetic characteristics mentioned above can be realized particularly by an Ni—Zn ferrite of cubic system or a ferrite of hexagonal system.

DETAILED DESCRIPTION OF THE PREFERRED EMBODIMENTS

Now, a magnetic head for magneto-optic recording and a magneto-optic recording apparatus in embodiments of the present invention will be described in detail.

Figure 1A:
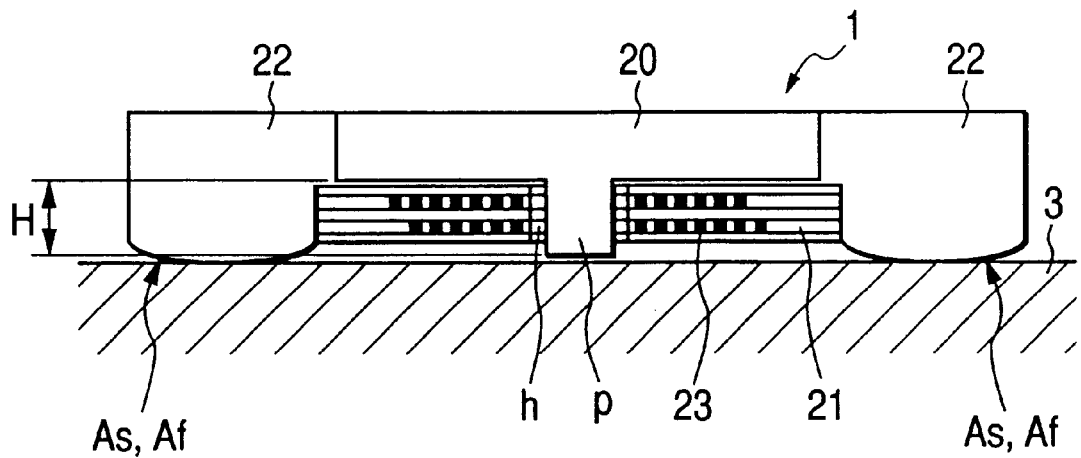
FIGS. 1A and 1B are a side sectional view and a bottom plan view showing the construction of a magnetic head for magneto-optic recording in an embodiment of the present invention, respectively.
Figure 1B:
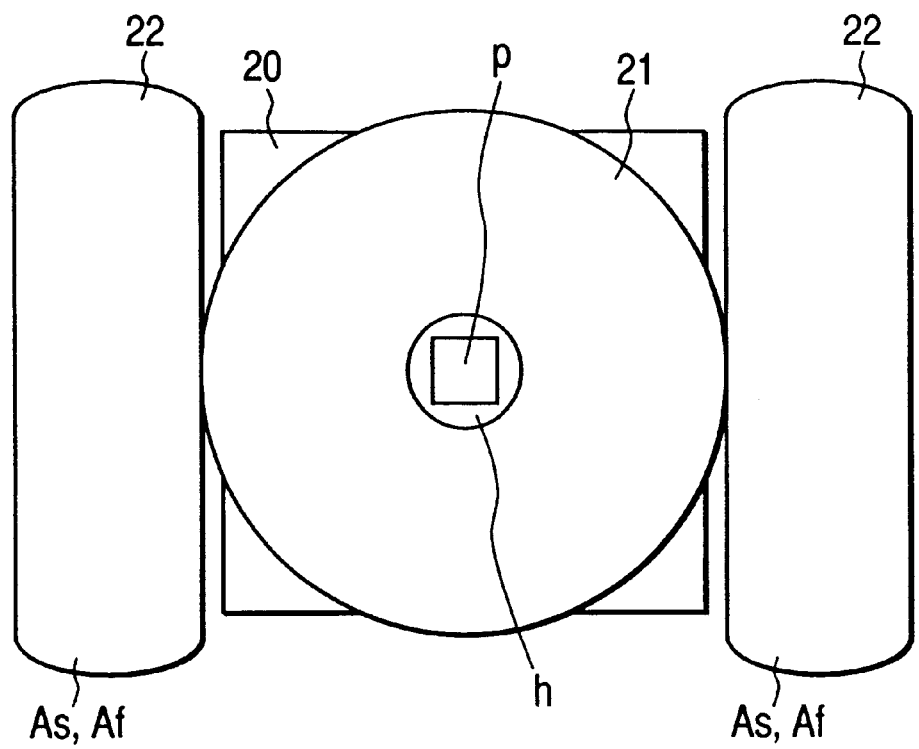

FIGS. 1A and 1B illustrate the construction of a magnetic head 1 for magneto-optic recording. FIG. 1A is a side sectional view, while FIG. 1B is a bottom plan view. The magnetic head 1 includes a core 20, a coil 21, and sliders 22 on which the members 20 and 21 are mounted. Numeral 3 designates a magneto-optic disk serving as a magneto-optic recording medium. The core 20 of the magnetic head 1 is made of a soft magnetic ferrite, and it is in the shape of a square plate, which is centrally provided with a magnetic pole p protruded in the shape of a square pillar perpendicular to the magneto-optic disk 3. The height of the magnetic pole p will be denoted by letter H, while the cross-sectional area thereof parallel to the magneto-optic disk 3 will be denoted by letter S. A circular hole h is formed centrally of the coil 21, and a coil pattern 23 made of copper films is formed so as to surround the hole h. The coil 21 is mounted around the magnetic pole p of the core 20, and this magnetic pole p is arranged in the hole h of the coil 21. A magnetic field is generated from the end face of the magnetic pole p of the core 20 by supplying the coil pattern 23 of the coil 21 with a current modulated by an information signal, and it is applied to the magneto-optic disk 3 perpendicularly. Each of the sliders 22 is made of a resin or ceramics, and the lower surface thereof opposing the magneto-optic disk 3 acts as a sliding surface As for allowing the magnetic head 1 to slide on the magneto-optic disk 3 or as a floating surface Af for allowing the same to run afloat.

Next, the core 20 of the magnetic head 1 will be explained. In this embodiment, the core 20 should desirably be made of the soft magnetic ferrite, particularly a Ni—Zn ferrite (containing $Fe_2O_3$, NiO and ZnO as principal components) of cubic system (spinel type crystalline structure). The Ni—Zn ferrite of cubic system can be endowed with any desired relative permeability $\mu$ by changing the composition ratio of the constituent components. It is suitable especially for attaining the characteristics of the desirable relative permeability $\mu$ which can diminish high-frequency loss as will be stated below.

There will now be explained the characteristics of the desirable relative permeability $\mu$ of the Ni—Zn ferrite of which the core 20 is made. Since the high-frequency loss is pertinent here, the relative permeability $\mu$ shall be dealt with as a complex number, which has a real part $\mu'$ and an imaginary part $\mu''$. Accordingly, the relative permeability $\mu$ is expressed as $\mu=\mu'-j\mu''$. In addition, the relative permeability $\mu$ in vacuum shall be set at 1 (one).

Figure 2:
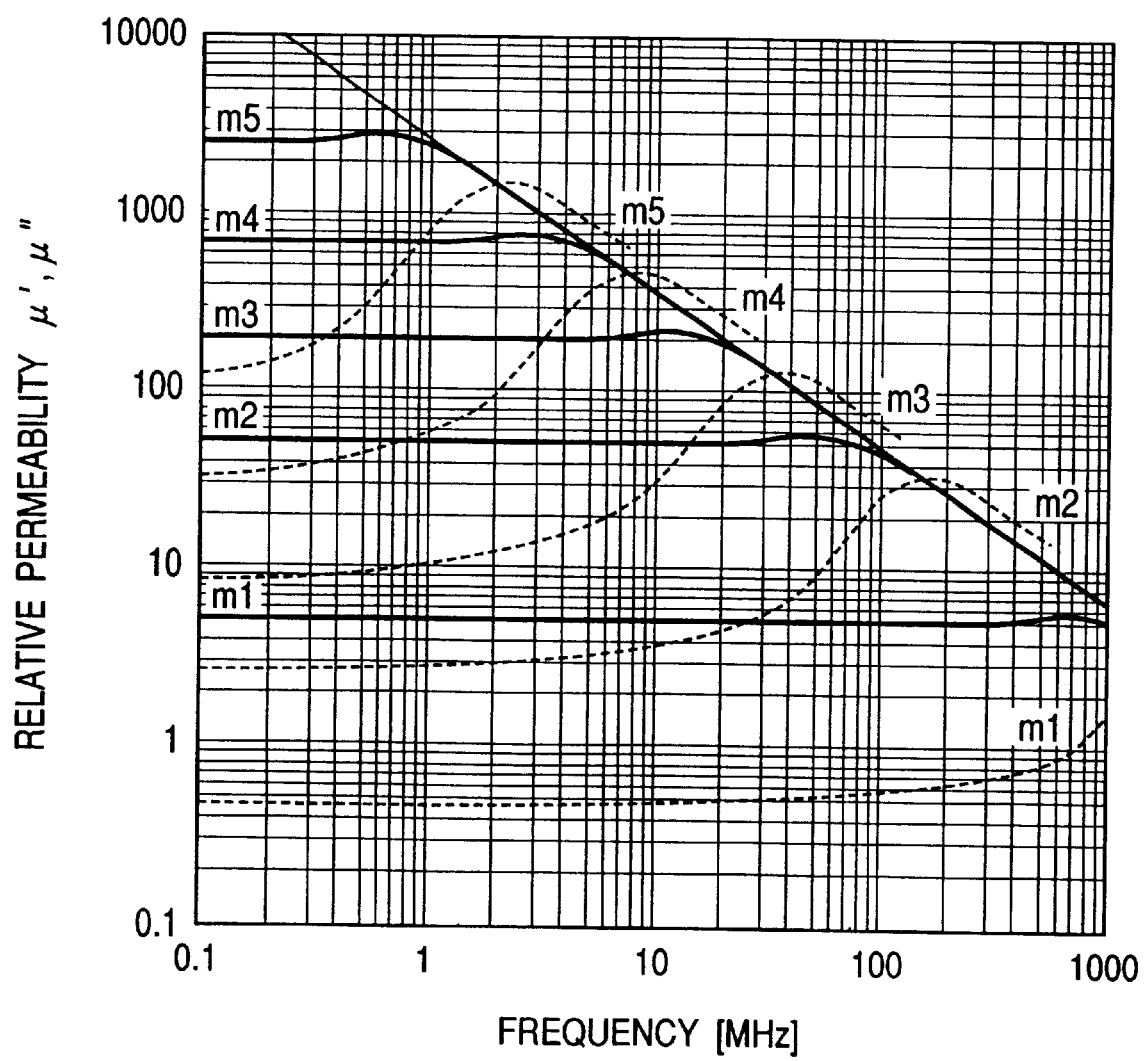
FIG. 2 is a graph showing the frequency characteristics of the relative permeability of an Ni—Zn ferrite of cubic system.

Referring to FIG. 2, the samples m1, m2, m3 and m4 (examples of the present invention) and m5 (comparative example) of the Ni—Zn ferrite of cubic system were prepared so as to have different relative permeabilities $\mu$ by changing the composition of the ferrite. In the figure, the frequency characteristics of the real part $\mu'$ of the relative permeability of each sample as measured at a temperature of 25° C. are indicated by a solid line, while the frequency characteristics of the imaginary part $\mu''$ are indicated by a broken line. Here, regarding the Ni—Zn ferrite for use in the magnetic head in this embodiment, the real part $\mu 1'$ of the relative permeability of the sample m1 at a frequency of 100 kHz is 5, the real part $\mu 1'$ of the relative permeability of the sample m2 at the same frequency is 50, the real part $\mu 1'$ of the relative permeability of the sample m3 at the same frequency is 200, and the real part $\mu 1'$ of the relative permeability of the sample m4 at the same frequency is 700. Besides, regarding the Ni—Zn ferrite prepared for the sake of comparison, the real part $\mu 1'$ of the relative permeability of the sample m5 at the frequency of 100 kHz is 2500.

As shown in FIG. 2, the real part $\mu'$ of the relative permeability of the Ni—Zn ferrite has a substantially constant value at a certain specified frequency and below without depending upon frequencies, but it decreases for a values constant rate at above the specified frequency as the frequencies rise. Such characteristics are ascribable to the ferromagnetic resonance (revolving magnetization resonance) of the ferrite. Here in this specification, the specified frequency mentioned above shall be termed the resonance frequency fr. The real part $\mu'$ of the relative permeability sometimes becomes a maximum at the resonance frequency fr as illustrated in the graph. In general, the resonance frequency fr is inversely proportional to the real part $\mu'$ of the relative permeability at a sufficiently low frequency (for example, to the real part $\mu 1'$ of the relative permeability at the frequency of 100 kHz). That is, the resonance frequency fr is higher and the real part $\mu'$ of the relative permeability holds a substantially constant value in a range of a low frequency to a higher frequency, as the real part $\mu'$ of the relative permeability is smaller. In a frequency range exceeding the resonance frequencies fr of the respective samples, all the real parts $\mu'$ of the relative permeabilities decrease along a substantially identical straight line L. The straight line L is usually called the "Snoek limitation line". It is known that the real part $\mu'$ of the relative permeability of the ferrite of cubic system cannot exceed the limitation line. On the other hand, the imaginary part $\mu''$ of the relative permeability of each sample increases with the measurement frequency in the vicinity of the resonance frequency fr, and it reaches a maximum value at a frequency fp which is somewhat higher than the resonance frequency fr.

Subsequently, magnetic heads were constructed in such a way that cores having the same shape and size were fabricated using the respective samples of the ferrite, and that coils were mounted around the magnetic poles of the cores. Further, each of the magnetic heads was equivalently regarded as a parallel circuit consisting of an inductance Lp and a high-frequency resistance Rp, and the high-frequency resistance Rp was measured at a frequency of 10 MHz. Here, the high-frequency resistance Rp corresponds to high-frequency loss, and the high-frequency loss is less as the high-frequency resistance Rp becomes higher.

Table 1 lists the characteristics of the relative permeabilities $\mu$ of the respective samples of the ferrite, and the high-frequency resistances Rp of the magnetic heads manufactured using these samples. It is understood from the table that the high-frequency resistance Rp is set higher so as to lead to less high-frequency loss as the resonance frequency fr of the ferrite making the core, or the frequency fp maximizing the imaginary part $\mu''$ of the relative permeability of the ferrite, becomes higher.

TABLE 1

List of Characteristics of Permeabilities of Respective samples of Ferrite

| Sample | | Real part $\mu1'$ of Relative permeability (at 100 kHz) | Resonance frequency fr [MHz] | Frequency fp maximizing $\mu''$ [MHz] | High-frequency resistance Rp [$\Omega$] |
|---|---|---|---|---|---|
| Present invention | m1 | 5 | 700 | Above 1000 | 3200 |
| | m2 | 50 | 50 | 170 | 3000 |
| | m3 | 200 | 10 | 33 | 2800 |
| | m4 | 700 | 2.1 | 8 | 2400 |
| Comparative example | m5 | 2500 | 0.55 | 2 | 1600 |

Further, the inventors' study has revealed the fact that, setting at most 700 as the value of the real part $\mu1'$ of the relative permeability of the ferrite making the core, at the frequency of 100 kHz, and at least 2.1 MHz as the value of the resonance frequency fr, as in the samples m1, m2, m3 and m4, is desirable particularly for diminishing the high-frequency loss at frequencies of 5 MHz and above.

Here, in the case where the real part $\mu'$ of the relative permeability of the ferrite becomes the maximum at the specified frequency immediately before the Snoek limitation line (straight line L) as illustrated also in FIG. 2, this specified frequency shall be considered as the resonance frequency fr. In some cases, however, such a maximum of the real part $\mu'$ of the relative permeability cannot be clearly confirmed, and the resonance frequency fr cannot be strictly specified. In such cases, the real part $\mu1'$ of the relative permeability of the ferrite making the core, at the frequency of 100 kHz, is set at the value of at most 700, and the frequency fp at which the imaginary part $\mu''$ of the relative permeability becomes the maximum is set at a value of at least 8 MHz, as in the samples m1, m2, m3 and m4. Even with these settings, the effect of diminishing the high-frequency loss can be similarly attained.

Alternatively, the real part $\mu1'$ of the relative permeability of the ferrite making the core, at the frequency of 100 kHz, is set at the value of at most 700, and the real part $\mu'$ of the relative permeability in a frequency range of above 100 kHz to at most 5 MHz, is set at a substantially constant value irrespective of the frequencies, that is, a value of at least 0.5 $\mu1'$ and at most 1.5 $\mu1'$, as in the samples m1, m2, m3 and m4. Even with these settings, the effect of diminishing the high-frequency loss can be similarly attained.

In addition, the real part $\mu'$ of the relative permeability of the ferrite making the core of the magnetic head is set at a value of at least 5, and the dimensions of the magnetic pole of the core are brought into an appropriate range. It has been verified that a magnetic field strong enough to record an information signal on a magneto-optic recording medium can be generated in this way. These settings will be explained below.

The relationship among the strength of the magnetic field which is generated by the magnetic head, the dimensions of the magnetic pole of the core, and the relative permeability $\mu$ of the ferrite making the core, was investigated as follows: Regarding the models of the samples c1, c2 and c3 (examples of the present invention) and c4 (comparative example) of cores 20 which had the shape shown in FIGS. 1A and 1B and which differed only in the height H of the magnetic pole p, the relations between the strength of the generated magnetic field and the real part $\mu'$ of the relative permeability $\mu$ were obtained by simulation calculations. Here, the cross section of the magnetic pole p of each of the samples of the cores 20 was in the shape of a regular square each side of which was 133 $\mu$m long (that is, the cross-sectional area S of which was 17700 $\mu m^2$). In addition, regarding the examples of the present invention, the height H of the magnetic pole p of the sample c1 was 150 $\mu$m, that H of the magnetic pole p of the sample c2 was 250 $\mu$m, and that H of the magnetic pole p of the sample c3 was 350 $\mu$m, while the height H of the magnetic pole p of the sample c4 being the comparative example was 450 $\mu$m. Besides, the number of turns of the coil pattern 23 of the coil 21 was 24, and a current supplied to the coil 21 was 100 mA.

Figure 3:
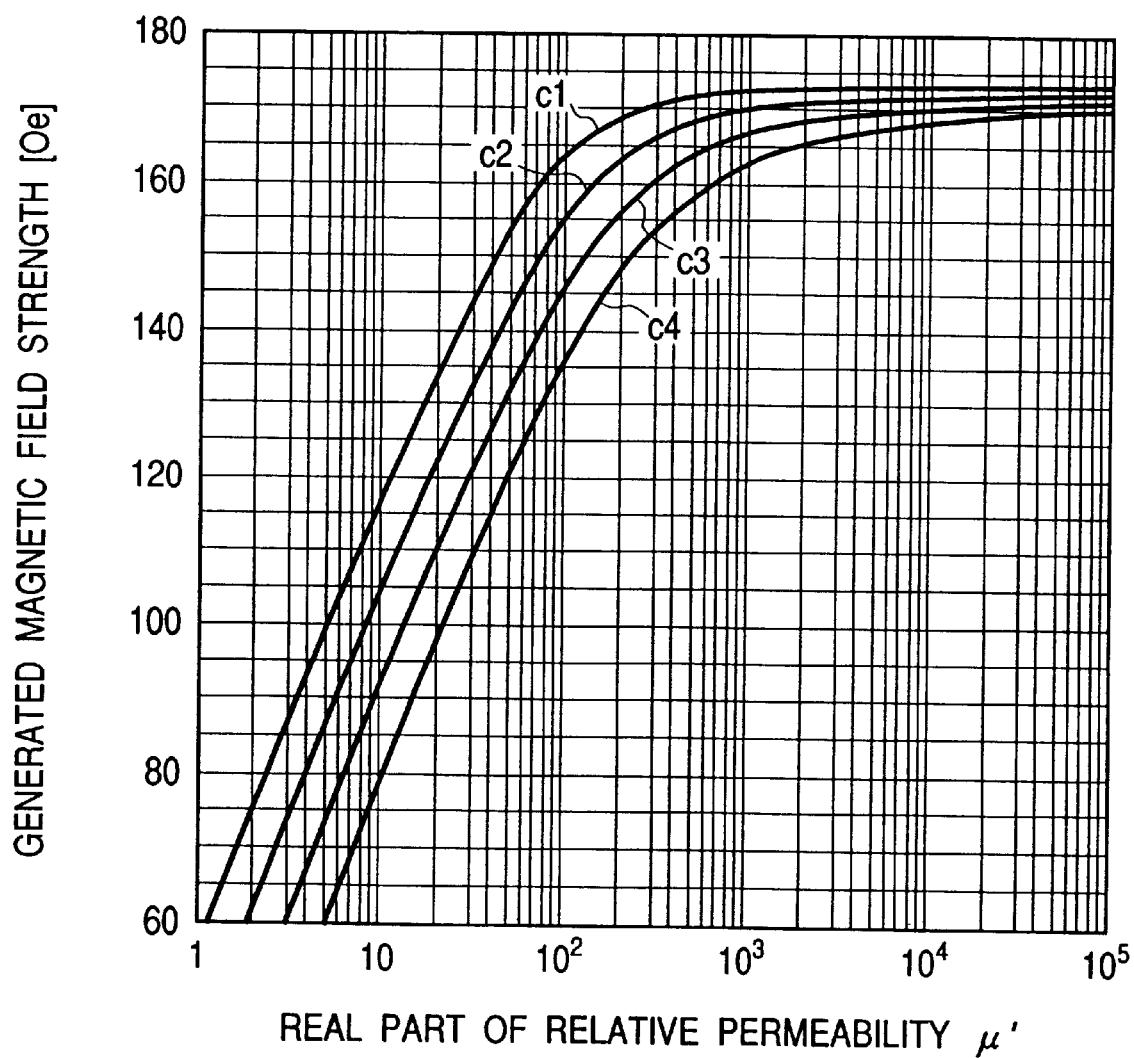
FIG. 3 is a graph showing the relationship between the real part $\mu'$ of a relative permeability and the strength of a generated magnetic field.

Referring to FIG. 3, the relations between the real part $\mu'$ of the relative permeability and the strength of the magnetic field at a point spaced 25 $\mu$m vertically from the center of the end face of the magnetic pole p are graphically illustrated as to the respective samples c1–c4. In any of the samples, the strength of the generated magnetic field is higher as the real part $\mu'$ of the relative permeability is greater. However, in a case where the real part $\mu'$ of the relative permeability is sufficiently great (on the order of at least $10^4$), the strength of the generated magnetic field exhibits a substantially constant value Hs, hardly depending upon the real part $\mu'$ of the relative permeability. Besides, as the real part $\mu'$ of the relative permeability is smaller, the strength of the generated magnetic field becomes lower. However, as the height H of the magnetic pole p becomes smaller, the lowering of the generated magnetic field strength is less, so that the magnetic field can be efficiently generated even in a range in which the real part $\mu'$ of the relative permeability is smaller.

Here, let's assume an expression $H/\sqrt{S}=\alpha$ (where letter H denotes the height of the magnetic pole p, and letter S denotes the average cross-sectional area of the magnetic pole p). The quantity $\alpha$ of the sample c1 is 1.13, that $\alpha$ of the sample c2 is 1.88, that $\alpha$ of the sample c3 is 2.63, and that $\alpha$ of the sample c4 is 3.38. When the real part $\mu'$ of the relative permeability is sufficiently great (on the order of at least $10^4$), the difference of the values of the quantity $\alpha$ does not greatly affect the strength of the generated magnetic field. However, when the real part $\mu'$ of the relative permeability is small, the generated magnetic field strength is higher as the value of the quantity $\alpha$ is smaller. Such characteristics can be construed to result from the fact that a demagnetizing field in the core 20 will become stronger as the core 20 has the shape in which the value of the quantity $\alpha$ is smaller.

It is understood from FIG. 3 that the sample c1 having the smallest value as the quantity $\alpha$ of the magnetic pole p is capable of generating a magnetic field of above 100 Oe when the real part $\mu'$ of the relative permeability of the ferrite making the core 20 is set at a value of at least 5. On the other hand, a magneto-optic recording medium which has the highest realizable magnetic-field sensitivity is capable of recording an information signal when a magnetic field of 100 Oe is applied thereto. Accordingly, a magnetic head and a magneto-optic recording apparatus which are practicable can be created in such a way that the magnetic pole p of the core 20 of the magnetic head 1 is set at dimensions which afford a sufficiently small value as the quantity $\alpha$ as in, for example, the sample c1, and that the real part $\mu'$ of the relative permeability of the ferrite making the core 20 is set at the value of at least 5.

As stated before, when the real part $\mu'$ of the relative permeability of the ferrite making the core 20 of the magnetic head 1 is set at the value of at most 700, the effect of diminishing the high-frequency loss of the core 20 can be attained. As illustrated in FIG. 3, however, the strength of the generated magnetic field becomes lower as the real part $\mu'$ of the relative permeability of the ferrite making the core 20 of the magnetic head 1 is smaller. Considering this point, the inventors made a further study on those desirable ranges of the dimensions of the magnetic core p of the core and the real part $\mu'$ of the relative permeability of the ferrite making the core in which a magnetic field strong enough to record an information signal can be generated even for a magneto-optic recording medium of comparatively low recording magnetic-field sensitivity, and in which the high-frequency loss of the core can be diminished at frequencies of 5 MHz and above.

Table 2 lists the values of the quantities $\alpha$ in the respective samples of the core 20, the constant values Hs of the generated magnetic field strengths for the sufficiently great real parts $\mu'$ of the relative permeabilities, those real parts $\mu'(0.92)$ of the relative permeabilities at which the generated magnetic field strengths become 92% of the values Hs, those real parts $\mu'(0.95)$ of the relative permeabilities at which the generated magnetic field strengths become 95% of the values Hs, and those real parts $\mu'(0.98)$ of the relative permeabilities at which the generated magnetic field strengths become 98% of the values Hs.

TABLE 2

List of Characteristics of Respective samples of Core

| Sample | | $\alpha$(H/√S) | Hs[Oe] | $\mu'(0.92)$ | $\mu'(0.95)$ | $\mu'(0.98)$ |
|---|---|---|---|---|---|---|
| Present invention | c1 | 1.13 | 173 | 70 | 110 | 260 |
| | c2 | 1.88 | 172 | 130 | 240 | 680 |
| | c3 | 2.63 | 171 | 220 | 480 | 1600 |
| Comparative example | c4 | 3.38 | 170 | 410 | 950 | 3300 |

Here, when each sample of the core 20 is made of a ferrite as to which the real part $\mu'$ of the relative permeability is equal to the value of the real part $\mu'(0.95)$ indicated in Table 2, it can generate a magnetic field at a strength of 95% of the constant value Hs of the generated magnetic field strength in the case of making the core 20 out of a ferrite whose relative permeability has a sufficiently great real part $\mu'$, that is, it can efficiently generate the magnetic field. Regarding the samples c1, c2 and c3 of the core 20 for use in the magnetic head 1 in this embodiment, all the real parts $\mu'(0.95)$ have values of less than 700. Accordingly, even when the core is made of a ferrite which has the desirable permeability characteristics capable of diminishing the high-frequency loss as stated before, that is, the ferrite whose relative permeability has the real part $\mu'$ being at most 700, each of the samples c1–c3 is adapted to generate the magnetic field of 95% of the value Hs (the magnetic field which is strong enough to record the information signal on the magneto-optic recording medium), and also to satisfactorily diminish the high-frequency loss of the core at the frequencies of 5 MHz and above.

In contrast, the real part $\mu'(0.95)$ of the sample c4 prepared for the sake of comparison is greater than 700. Accordingly, the sample c4 is incapable of generating a magnetic field of 95% of the value Hs and satisfactorily diminishing the high-frequency loss of the core at the frequencies of 5 MHz and above.

Besides, the inventors' study has revealed that the real part $\mu'(0.95)$ is approximately expressed by the following equation (3) as a function of the quantity $\alpha$:

$$\mu'(0.95)=10^{1.60+0.415\alpha} \qquad (3)$$

It is understood from Eq. (3) that $\alpha \leq 3$ may be set for establishing $\mu'(0.95) \leq 700$. In other words, the magnetic pole p of the core 20 must be endowed with dimensions meeting $\alpha \leq 3$ in order to realize the efficient generation of the magnetic field (the magnetic field of 95% of a value Hs) even in the case where the core is made of the ferrite which has the desirable permeability characteristics capable of diminishing the high-frequency loss as stated before, that is, a ferrite whose relative permeability has the real part $\mu'$ being at most 700.

Simultaneously, the core 20 may be made of a ferrite which can diminish the high-frequency loss at a frequencies of 5 MHz and above as stated before, that is, a ferrite whose relative permeability exhibits a real part $\mu 1'$ of at most 700 at the frequency of 100 kHz and whose resonance frequency fr is at least 2.1 MHz. Alternatively, the core 20 may be made of a ferrite as to which the real part $\mu 1'$ of the relative permeability at a frequency of 100 kHz is at most 700, and the frequency fp maximizing the imaginary part $\mu''$ of the relative permeability is at least 8 MHz. Still alternatively, the core 20 may be made of a ferrite as to which the real part $\mu 1'$ of the relative permeability at the frequency of 100 kHz is at most 700, and the real part of the relative permeability in the frequency range of above 100 kHz to at most 5 MHz is at least 0.5 $\mu 1'$ and at most 1.5 $\mu'$.

In this way, it is permitted to diminish the high-frequency loss of the core 20 in the magnetic head 1 and also to generate a magnetic field strong enough to record the information signal on the magneto-optic recording medium.

Besides, in permitting the magnetic head 1 to record an information signal even on a magneto-optic recording medium whose recording magnetic-field sensitivity is comparatively low, a magnetic field needs to be generated at an especially high efficiency. It is accordingly more desirable to make the core 20 out of a ferrite as to which the real part $\mu'$ of the relative permeability falls within a range of $\mu'(0.92) \leq \mu' \leq \mu'(0.98)$, in accordance with the value of the quantity $\alpha$ concerning the magnetic pole p of the core 20 of the magnetic head 1. In this way, the magnetic head 1 can generate a magnetic field at a strength of at least 92% and at most 98% of the constant value Hs of the generated magnetic field strength in the case of making the core 20 out of a ferrite as to which the real part $\mu'$ of the relative permeability is sufficiently great. That is, the magnetic head 1 can generate a magnetic field efficiently. Moreover, the inventors' study has revealed that the real parts $\mu'(0.92)$ and $\mu'(0.98)$ are respectively approximated by the following equations (4) and (5) as functions of the quantity $\alpha$:

$$\mu'(0.92) = 10^{1.45 + 0.343\alpha} \quad (4)$$

$$\mu'(0.98) = 10^{1.93 + 0.480\alpha} \quad (5)$$

Accordingly, the core 20 should more desirably be made of a ferrite as to which the real part $\mu 1'$ of the relative permeability at the frequency of 100 kHz falls within a range expressed by the following equation (6), in accordance with the value of the quantity $\alpha$ of the magnetic pole p:

$$10^{1.45 + 0.343\alpha} \leq \mu 1' \leq 10^{1.93 + 0.480\alpha} \quad (6)$$

By the way, in the foregoing description, all the relative permeabilities of the ferrites making the cores 20 of the magnetic heads 1 have been given as values at a temperature of 25° C. Meanwhile, a temperature inside a magneto-optic recording apparatus is usually higher than the ambient temperature of the apparatus during the recording operation of the apparatus, and the magnetic head 1 included in the apparatus is often operated under an environment whose temperature is at least 20° C. and at most 80° C. Besides, the permeability of the ferrite depends upon temperatures. Therefore, in order to prevent the strength of the generated magnetic field from decreasing even in a case where the operating temperature of the magnetic head 1 has risen, the core 20 should desirably be made of a ferrite having such characteristics that the real part $\mu'$ of the relative permeability has a plus temperature coefficient in a temperature range of at least 20° C. to at most 80° C., in other words, that the real part $\mu'$ of the relative permeability increases with the rise of the temperature.

Besides, in order to prevent a magnetic flux from being saturated within the core 20 on account of the temperature rise, this core should desirably be made of a ferrite the Curie temperature Tc of which is at least 200° C., and the saturation magnetic flux density Bs of which is at least 3500 Gauss when measured by applying a magnetic field of 50 Oe at a temperature of 25° C.

All the characteristics explained above can be actualized using the Ni—Zn ferrite of cubic system. In addition, a core 20 can be fabricated by machining a single crystal of a Ni—Zn ferrite of cubic system, or by machining a high-density sintered compact of a Ni—Zn ferrite obtained in such a way that powdery raw materials are sintered by a hot isostatic press.

Figure 4A:
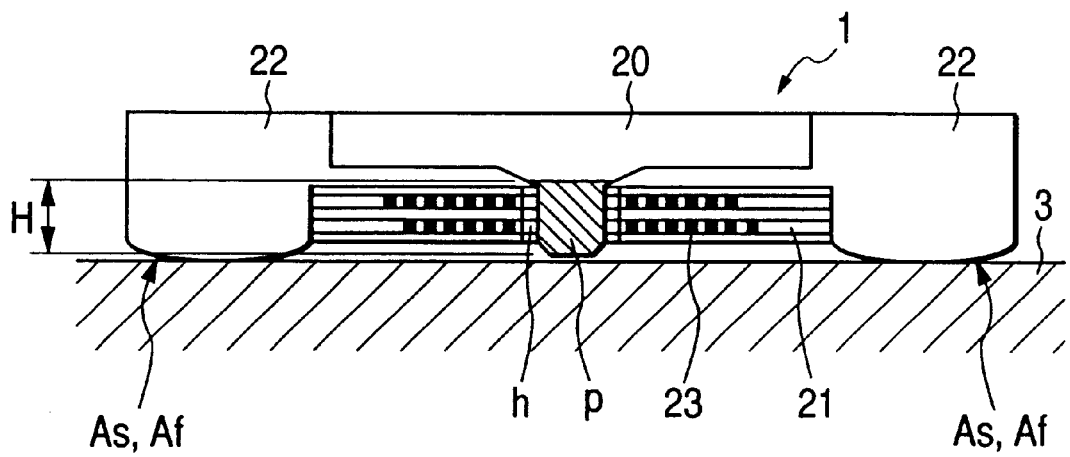
FIGS. 4A and 4B are a side sectional view and a bottom plan view showing the construction of a magnetic head for magneto-optic recording in another embodiment of the present invention, respectively.
Figure 4B:
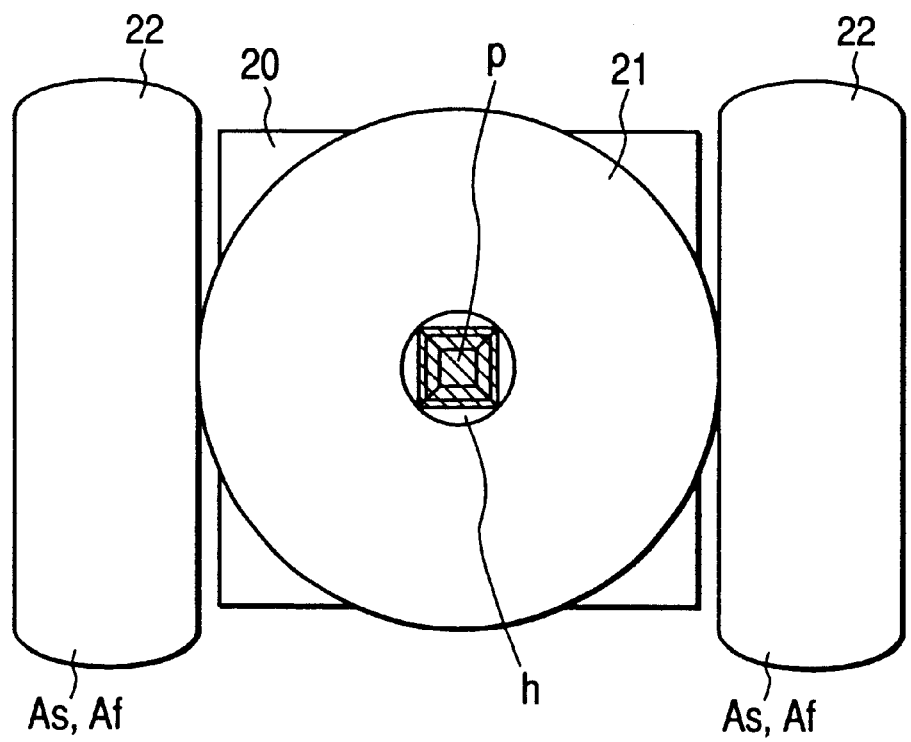

The magnetic pole p of the core 20 of the magnetic head 1 shown in FIGS. 1A and 1B is in the shape of a square pillar, and the area S of the cross section thereof parallel to the magneto-optic disk 3 is the same irrespective of the vertical positions thereof, so that the value of the quantity $\alpha$ can be calculated with ease. Besides, in a case where the cross-sectional area of the magnetic pole p differs depending upon the vertical positions thereof, the value of the quantity $\alpha$ may be calculated with the area S being the average V/H of the cross-sectional area of the magnetic pole p (where letter V denotes the volume of the magnetic pole p, and letter H denotes the height thereof). Further, the expression "magnetic pole" of the core 20 shall signify only that part of the core 20 the size of which is such that the cross section thereof parallel to the magneto-optic recording medium can be arranged inside the hole h of the coil 21, and which is surrounded with the coil 21 at least partially. By way of example, in a magnetic head 1 having a core 20 in a shape as shown by a side sectional view in FIG. 4A and a bottom plan view in FIG. 4B, only that cross-hatched part of the protrusion of the illustrated core 20 shall form a magnetic pole p, and that uppermost part of the protrusion whose size is such that it cannot be arranged inside the hole h of a coil 21 on account of its expanded cross section shall not be included in the magnetic pole p. Herein, the average S (=V/H) of the cross-sectional area of the magnetic pole p and the quantity $\alpha$ (=H/$\sqrt{S}$) of the magnetic pole p may be calculated with letter V denoting the volume of this magnetic pole p and letter H denoting the height thereof.

Besides, in order to diminish high-frequency loss in the core 20 and to simultaneously raise the generation efficiency of the magnetic head 1 for a magnetic field, the core 20 should desirably be shaped so that the magnetization of the end face of the magnetic pole p generates an appropriate counter magnetic field inside the core 20. Concretely, as exemplified in FIGS. 1A and 1B, the core 20 should desirably be constituted by only the part substantially parallel to the magneto-optic disk 3 (the part in the shape of the square plate), and the protrusive magnetic pole p. When a portion which incurs magnetization reverse to that of the end face of the magnetic pole p is arranged in the vicinity of this end face, undesirably a counter magnetic field inside the magnetic pole p decreases. Accordingly, at least the core 20 should desirably be shaped so that none of its constituent parts is arranged between the lower surface of the coil 21 and the magneto-optic disk 3.

Figure 5:
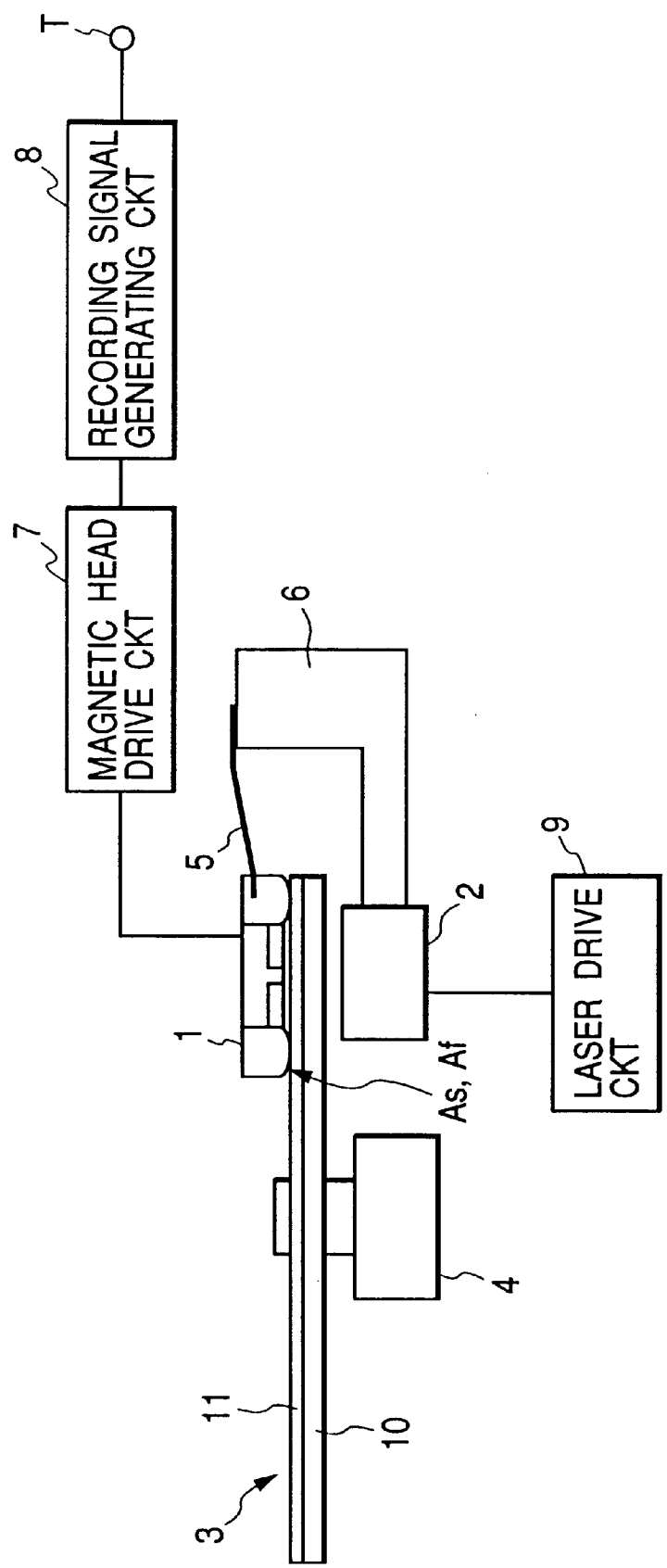
FIG. 5 is a block diagram showing the construction of a magneto-optic recording apparatus in an embodiment of the present invention.

Next, a magneto-optic recording apparatus embodying the present invention will be described with reference to FIG. 5. The figure illustrates the schematic construction of the magneto-optic recording apparatus. Here, numeral 3 designates a magneto-optic disk which is a magneto-optic recording medium for recording an information signal. The magneto-optic disk 3 includes a substrate 10 which is made of a transparent material, and a magnetic recording layer 11 which is made of a magnetic material and which is formed on the substrate 10. This magneto-optic disk 3 is driven to rotate by a spindle motor 4. The magnetic head 1 shown in FIGS. 1A and 1B is arranged on the upper surface side of the magneto-optic disk 3, while an optical head 2 is arranged on the lower surface side of the magneto-optic disk 3 so as to oppose the magnetic head 1.

The magnetic head 1 is attached to the distal end of an elastic support member 5, the base end of which is attached to a coupling member 6. Besides, the optical head 2 is mounted on the coupling member 6 so as to oppose the lower surface of the magneto-optic disk 3. The magnetic head 1 and the optical head 2 are unitarily transferred to any desired radial position of the magneto-optic disk 3 by transfer means not shown.

A magnetic head drive circuit 7 is connected to the coil 21 of the magnetic head 1, and a recording signal generation circuit 8 is connected to the magnetic head drive circuit 7. In addition, the optical head 2 is configured of a laser light source, a light sensor, an optical system, etc. A laser drive circuit 9 is connected to the laser light source.

In the case of recording an information signal on the magneto-optic disk 3, the magneto-optic disk 3 is rotated by the spindle motor 4. Thus, the magnetic head 1 runs sliding on the magneto-optic disk 3 or floating therefrom, with the sliding surfaces As or floating surfaces Af of the sliders 22 held in opposition to the magneto-optic disk 3. The recording signal generation circuit 8 subjects the information signal received from an input terminal T, to processing such as encoding, thereby to generate a recording signal, and it delivers the recording signal to the magnetic head drive circuit 7. The magnetic head drive circuit 7 supplies the coil 21 of the magnetic head 1 with a current modulated by the recording signal. The amplitude of the current is 100 mA or so. Thus, a magnetic field modulated by the information signal is generated from the end face of the magnetic pole p of the magnetic head 1, and the generated magnetic field is applied to the magnetic recording layer 11 of the magneto-optic disk 3 perpendicularly. The highest modulation frequency of the magnetic field (the inverse number of double the minimum time interval of the inversion of the magnetic field) is at least 5 MHz, and the amplitude thereof is at least 100 Oe. At the same time, the laser light source of the optical head 2 emits a light beam by feeding a current from the laser drive circuit 9. The light beam is focused into a minute light spot by the optical system, and that region of the magnetic recording layer 11 to which the magnetic field is applied is irradiated with the focused light spot. As a result, the magnetic recording layer 11 is formed with a magnetized region in which the direction of magnetization changes in correspondence with the change of the direction of the applied magnetic field, whereby the information signal is recorded.

Here, the high-frequency loss of the core of the magnetic head at frequencies of at least 5 MHz is diminished as stated before. In the magneto-optic recording apparatus according to the present invention, therefore, the highest modulation frequency of the magnetic field can also be raised to about 30 MHz. As a result, the recording speed of the apparatus for the information signal can be enhanced.

In the foregoing embodiment, there have been explained the characteristics of the permeability of the ferrite which is the material of the core capable of diminishing the high-frequency loss of the core at frequencies of 5 MHz and above. Such permeability characteristics can also be attained with a ferrite of hexagonal system (the crystalline structure of the magnetoplumbite type or the like), for example, a soft magnetic ferrite the principal components of which are $Fe_2O_3$ and MeO (where Me denotes any of elements such as Ba, Pb, Sr, Mn, Co, Ni, Zn and Cu).

Figure 6:
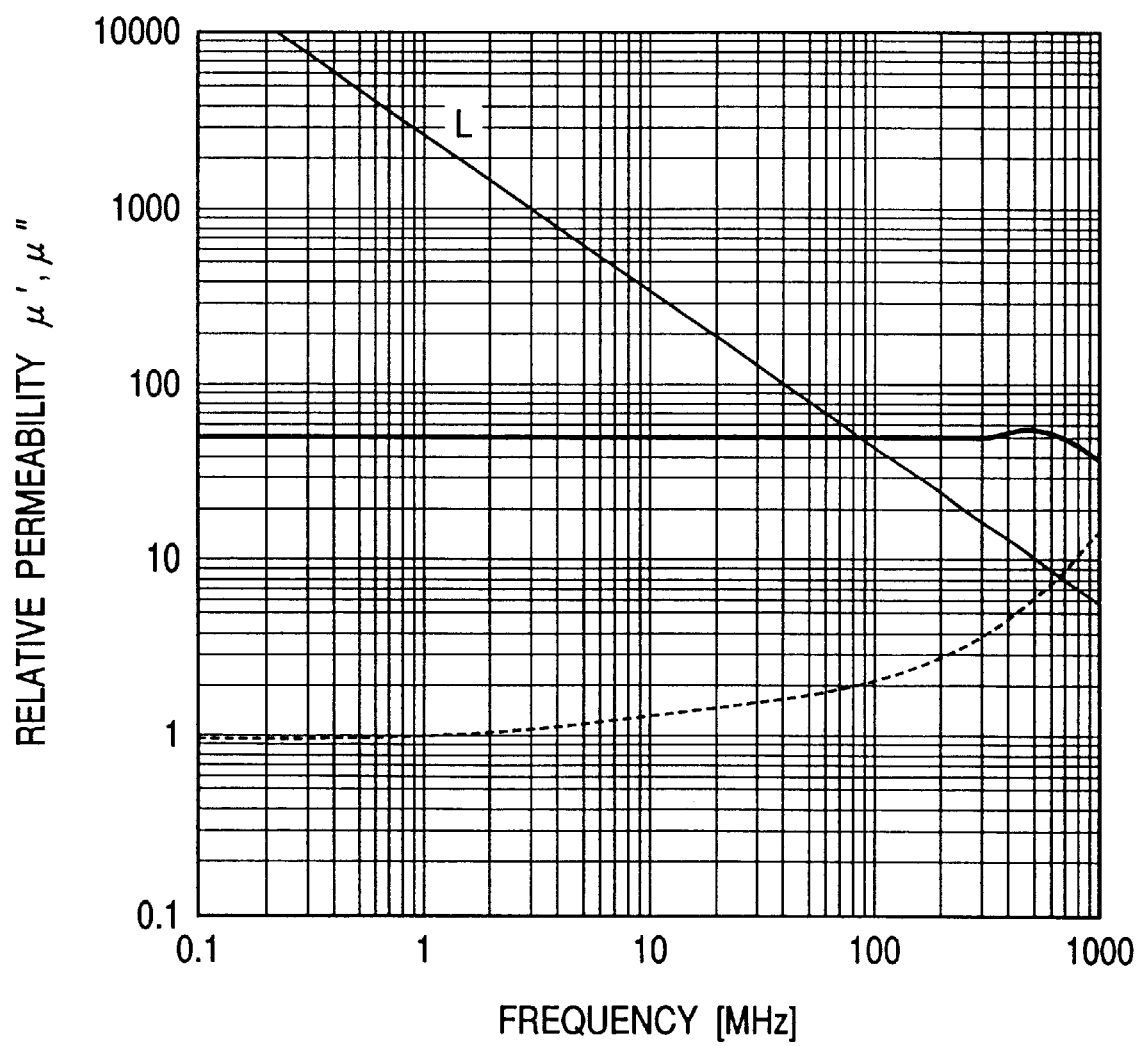
FIG. 6 is a graph showing the frequency characteristics of the relative permeability of a ferrite of hexagonal system.

An example of a ferrite of hexagonal system contains $Fe_2O_3$, BaO and CoO as its principal components. In FIG. 6, the frequency characteristics of the real part $\mu'$ of the relative permeability of the example as measured at a temperature of 25° C. are indicated by a solid line, while the frequency characteristics of the imaginary part $\mu''$ are indicated by a broken line. Here, the real part $\mu 1'$ of the relative permeability of the ferrite of hexagonal system at a frequency of 100 kHz is 50. Besides, as illustrated in FIG. 6, the real part $\mu'$ of the relative permeability of the ferrite of hexagonal system holds a substantially constant value in a range of a low frequency to a high frequency exceeding the Snoek limitation line (straight line L) explained before. It is also known that the resonance frequency fr of a ferrite of hexagonal system and the frequency fp thereof maximizing the imaginary part $\mu''$ of the relative permeability can be set higher than those of a ferrite of cubic system. It is accordingly possible to attain the desirable permeability characteristics adapted to diminish the high-frequency loss of the core as explained before.

More specifically, it is possible to set the value of at most 700 as the real part $\mu 1'$ of the relative permeability at the frequency of 100 kHz, and to set the value of at least 2.1 MHz as the resonance frequency fr. Alternatively, it is possible to set the value of at most 700 as the real part $\mu 1'$ of the relative permeability at the frequency of 100 kHz, and to set the value of at least 8 MHz as the frequency fp maximizing the imaginary part $\mu''$ of the relative permeability. Still alternatively, it is possible to set the value of at most 700 as the real part $\mu 1'$ of the relative permeability at the frequency of 100 kHz, and to set the substantially constant value, namely, at least $0.5\,\mu 1'$ and at most $1.5\,\mu 1'$ as the real part $\mu'$ of the relative permeability in the frequency range of above 100 kHz to at most 5 MHz. Accordingly, when the core 20 of the magnetic head 1 shown in FIGS. 1A and 1B is made of such a ferrite of hexagonal system, the high-frequency loss a frequencies of 5 MHz and above can be diminished.

Besides, the real part $\mu'$ of the relative permeability of the ferrite of hexagonal system making the core 20 can be set at the value of at least 5, and the magnetic pole p of the core 20 can be set at dimensions meeting the relation of $\alpha \leq 3$. It is therefore possible to generate a magnetic field which is strong enough to record an information signal on a magneto-optic recording medium.

As described above, a magnetic head for magneto-optic recording according to the present invention can diminish high-frequency loss within a core, sharply as compared with the loss in the prior art, in a case where the highest modulation frequency of a magnetic field is set at a value of at least 5 MHz. Accordingly, the magnetic head is free from such a problem that the magnetic characteristics of the core degrade due to a rise in the temperature of the magnetic head. Nevertheless, the magnetic head can generate a magnetic field strong enough to record an information signal on a magneto-optic recording medium.

Thus, with the magnetic head for magneto-optic recording and a magneto-optic recording apparatus according to the present invention, the highest modulation frequency of the magnetic field can be raised up to about 30 MHz, and a recording speed for the information signal is enhanced.

What is claimed is:

1. A magnetic head for magneto-optic recording, comprising:

a core which includes a magnetic pole in the shape of a pillar perpendicular to a magneto-optic recording medium; and a coil which is mounted around the magnetic pole;

wherein said core is made of a soft magnetic ferrite whose relative permeability at a frequency of 100 kHz has a real part $\mu 1'$ being at least 5 and at most 700 and whose resonance frequency fr is at least 2.1 MHz, and $\alpha \leq 3$ holds in a case where a height H and an average cross-sectional area S of said magnetic pole are related as $H/\sqrt{S}=\alpha$.

2. A magnetic head for magneto-optic recording as defined in claim 1, wherein the real part $\mu 1'$ of the relative permeability of the ferrite at the frequency of 100 kHz, and the quantity α satisfy the following equation:

$$10^{1.45+0.343\alpha} \leq \mu 1' \leq 10^{1.93+0.480\alpha}.$$

3. A magnetic head for magneto-optic recording as defined in claim 1, wherein a Curie temperature Tc of the ferrite is at least 200° C., and a saturation magnetic flux density Bs thereof at a temperature of 25° C. is at least 3500 Gauss.

4. A magnetic head for magneto-optic recording as defined in claim 1, wherein a relative permeability of the ferrite in a temperature range of at least 20° C. to at most 80° C. has a real part $\mu'$ of plus temperature coefficient.

5. A magnetic head for magneto-optic recording as defined in claim 1, wherein the ferrite of said core is a Ni—Zn ferrite of cubic system.

6. A magnetic head for magneto-optic recording as defined in claim 1, wherein the ferrite of said core is a ferrite of hexagonal system.

7. A magneto-optic recording apparatus, comprising:
a magnetic head comprising:
a core which includes a magnetic pole in the shape of a pillar perpendicular to a magneto-optic recording medium; and
a coil which is mounted around the magnetic pole,
wherein said core is made of a soft magnetic ferrite whose relative permeability at a frequency of 100 kHz has a real part $\mu 1'$ being at least 5 and at most 700 and whose resonance frequency fr is at least 2.1 MHz, and $\alpha \leq 3$ holds in a case where a height H and an average cross-sectional area S of said magnetic pole are related as $H/\sqrt{S}=\alpha$, and
where the magnetic head applies a magnetic field modulated by an information signal to a magneto-optic recording medium; and
an optical head which irradiates the magneto-optic recording medium with a light beam.

8. A magnetic head for magneto-optic recording, comprising:
a core which includes a magnetic pole in the shape of a pillar perpendicular to a magneto-optic recording medium; and
a coil which is mounted around the magnetic pole;
wherein said core is made of a soft magnetic ferrite whose relative permeability at a frequency of 100 kHz has a real part u1' being at least 5 and at most 700 and also has an imaginary part u" becoming a maximum at a frequency fp of at least 8 MHz, and $\alpha \leq 3$ holds in a case where a height H and an average cross-sectional area S of said magnetic pole are related as $H/\sqrt{S}=\alpha$.

9. A magnetic head for magneto-optic recording as defined in claim 8, wherein the real part $\mu 1'$ of the relative permeability of the ferrite at the frequency of 100 kHz, and the quantity α satisfy the following equation:

$$10^{1.45+0.343\alpha} \leq \mu 1' \leq 10^{1.93+0.480\alpha}.$$

10. A magnetic head for magneto-optic recording as defined in claim 8, wherein a Curie temperature Tc of the ferrite is at least 200° C., and a saturation magnetic flux density Bs thereof at a temperature of 20° C. is at least 3500 Gauss.

11. A magnetic head for magneto-optic recording as defined in claim 8, wherein a relative permeability of the ferrite in a temperature range of at least 20° C. to at most 80° C. has a real part $\mu'$ of plus temperature coefficient.

12. A magnetic head for magneto-optic recording as defined in claim 8, wherein the ferrite of said core is a Ni—Zn ferrite of cubic system.

13. A magnetic head for magneto-optic recording as defined in claim 8, wherein the ferrite of said core is a ferrite of hexagonal system.

14. A magneto-optic recording apparatus, comprising:
a magnetic head comprising:
a core which includes a magnetic pole in the shape of a pillar perpendicular to a magneto-optic recording medium; and
a coil which is mounted around the magnetic pole,
wherein said core is made of a soft magnetic ferrite whose relative permeability at a frequency of 100 kHz has a real part $\mu 1'$ being at least 5 and at most 700 and also has an imaginary part $\mu''$ becoming a maximum at a frequency fp of at least 8 MHz, and $\alpha \leq 3$ holds in a case where a height H and an average cross-sectional area S of said magnetic pole are related as $H/\sqrt{S}=\alpha$, and
where said magnetic head applies a magnetic field modulated by an information signal to the magneto-optic recording medium; and
an optical head which irradiates the magneto-optic recording medium with a light beam.

15. A magnetic head for magneto-optic recording, comprising:
a core which includes a magnetic pole in the shape of a pillar perpendicular to a magneto-optic recording medium; and
a coil which is mounted around the magnetic pole;
wherein said core is made of a soft magnetic ferrite whose relative permeability at a frequency of 100 kHz has a real part $\mu 1'$ being at least 5 and at most 700 and whose relative permeability in a frequency range of above 100 kHz to at most 5 MHz has a real part being at least 0.5 $\mu 1'$ and at most 1.5 $\mu 1'$, and $\alpha \leq 3$ holds in a case where a height H and an average cross-sectional area S of said magnetic pole are related as $H/\sqrt{S}=\alpha$.

16. A magnetic head for magneto-optic recording as defined in claim 15, wherein the real part $\mu 1'$ of the relative permeability of the ferrite at the frequency of 100 kHz, and the quantity α satisfy the following equation:

$$10^{1.45+0.343\alpha} \leq \mu 1' \leq 10^{1.93+0.480\alpha}.$$

17. A magnetic head for magneto-optic recording as defined in claim 15, wherein a Curie temperature Tc of the ferrite is at least 200° C., and a saturation magnetic flux density Bs thereof at a temperature of 25° C. is at least 3500 Gauss.

18. A magnetic head for magneto-optic recording as defined in claim 15, wherein a relative permeability of the ferrite in a temperature range of at least 20° C. to at most 80° C. has a real part $\mu'$ of plus temperature coefficient.

19. A magnetic head for magneto-optic recording as defined in claim 15, wherein the ferrite of said core is a Ni—Zn ferrite of cubic system.

20. A magnetic head for magneto-optic recording as defined in claim 15, wherein the ferrite of said core is a ferrite of hexagonal system.

21. A magneto-optical recording apparatus, comprising:
a magnetic head comprising:
a core which includes a magnetic pole in the shape of a pillar perpendicular to a magneto-optic recording medium; and
a coil which is mounted around the magnetic pole, wherein said core is made of a soft magnetic ferrite whose relative permeability at a frequency of 100 kHz has a real part $\mu1'$ being at least 5 and at most 700 and whose relative permeability in a frequency range of above 100 kHz to at most 5 MHz has a real part being at least 0.5 $\mu1'$ and at most 1.5 $\mu1'$, and $\alpha \leq 3$ holds in a case where a height H and an average cross-sectional area S of said magnetic pole are related as $H/\sqrt{S}=\alpha$, and where the magnetic head applies a magnetic field modulated by an information signal to the magneto-optic recording medium; and an optical head which irradiates the magneto-optic recording medium with a light beam.

22. A magneto-optic recording apparatus as defined in claim 7, wherein the real part $\mu1'$ of the relative permeability of the ferrite at the frequency of 100 kHz, and the quantity $\alpha$ satisfy the following equation:

$$10^{1.45+0.343\alpha} \leq \mu1' \leq 10^{1.93+0.480\alpha}.$$

23. A magneto-optic recording apparatus as defined in claim 7, wherein a Curie temperature Tc of the ferrite is at least 200° C., and a saturation magnetic flux density Bs thereof at a temperature of 25° C. is at least 3500 Gauss.

24. A magneto-optic recording apparatus as defined in claim 7, wherein a relative permeability of the ferrite in a temperature range of at least 20° C. to at most 80° C. has a real part $\mu'$ of plus temperature coefficient.

25. A magneto-optic recording apparatus as defined in claim 7, wherein the ferrite of said core is a Ni—Zn ferrite of cubic system.

26. A magneto-optic recording apparatus as defined in claim 7, wherein the ferrite of said core is a ferrite of hexagonal system.

27. A magneto-optic recording apparatus as defined in claim 14, wherein the real part $\mu1'$ of the relative permeability of the ferrite at the frequency of 100 kHz, and the quantity $\alpha$ satisfy the following equation:

$$10^{1.45+0.343\alpha} \leq \mu1' \leq 10^{1.93+0.480\alpha}.$$

28. A magneto-optic recording apparatus as defined in claim 14, wherein a Curie temperature Tc of the ferrite is at least 200° C., and a saturation magnetic flux density Bs thereof at a temperature of 25° C. is at least 3500 Gauss.

29. A magneto-optic recording apparatus as defined in claim 14, wherein a relative permeability of the ferrite in a temperature range of at least 20° C. to at most 80° C. has a real part $\mu'$ of plus temperature coefficient.

30. A magneto-optic recording apparatus as defined in claim 14, wherein the ferrite of said core is a Ni—Zn ferrite of cubic system.

31. A magneto-optic recording apparatus as defined in claim 14, wherein the ferrite of said core is a ferrite of hexagonal system.

32. A magneto-optic recording apparatus as defined in claim 21, wherein the real part $\mu1'$ of the relative permeability of the ferrite at the frequency of 100 kHz, and the quantity $\alpha$ satisfy the following equation:

$$10^{1.45+0.343\alpha} \leq \mu1' \leq 10^{1.93+0.480\alpha}.$$

33. A magneto-optic recording apparatus as defined in claim 21, wherein a Curie temperature Tc of the ferrite is at least 200° C., and a saturation magnetic flux density Bs thereof at a temperature of 25° C. is at least 3500 Gauss.

34. A magneto-optic recording apparatus as defined in claim 21, wherein a relative permeability of the ferrite in a temperature range of at least 20° C. to at most 80° C. has a real part $\mu'$ of plus temperature coefficient.

35. A magneto-optic recording apparatus as defined in claim 21, wherein the ferrite of said core is a Ni—Zn ferrite of cubic system.

36. A magneto-optic recording apparatus as defined in claim 21, wherein the ferrite of said core is a ferrite of hexagonal system.

* * * * *

UNITED STATES PATENT AND TRADEMARK OFFICE
CERTIFICATE OF CORRECTION

PATENT NO.   : 6,314,060 B1
DATED        : November 6, 2001
INVENTOR(S)  : Kazuyoshi Ishii It is certified that error appears in the above-identified patent and that said Letters Patent is hereby corrected as shown below:

Title page,
Item [*] Notice, please insert -- This patent issued on a continued prosecution application filed under 37 CFR 1.53(d), and is subject to the twenty year patent term provision of 35 U.S.C. 154(a)(2). --.

Column 4,
Line 39, "for a" should read -- at a --.
Line 40, "values constant rate at" should read -- constant rate for values --.

Column 5,
Line 66, "the" should be deleted.

Column 7,
Line 35, "C1 ," should read -- C1, --.

Column 8,
Line 50, "the" (3rd occurrence) should read -- a --.

Column 9,
Line 62, "the" should read -- a --.

Column 10,
Line 36, "should." should read -- should --.

Column 12,
Line 26, "a" should read -- at --.

UNITED STATES PATENT AND TRADEMARK OFFICE
CERTIFICATE OF CORRECTION

PATENT NO.   : 6,314,060 B1
DATED        : November 6, 2001
INVENTOR(S)  : Kazuyoshi Ishii It is certified that error appears in the above-identified patent and that said Letters Patent is hereby corrected as shown below:

<u>Column 13,</u>
Line 62, "20ºC." should read -- 25ºC. --.

Signed and Sealed this

Twenty-seventh Day of August, 2002

Attest:

Attesting Officer

JAMES E. ROGAN
*Director of the United States Patent and Trademark Office*